Nov. 23, 1971 T. H. FAIRBANKS ET AL 3,621,528
APPARATUS FOR EXTRUDING NET-LIKE FABRICS
Filed April 20, 1970

United States Patent Office 3,621,528
Patented Nov. 23, 1971

3,621,528
APPARATUS FOR EXTRUDING NET-LIKE FABRICS
Theodore H. Fairbanks, Liverpool, and Robert F. Gillespie, Havertown, Pa., assignors to FMC Corporation, Philadelphia, Pa.
Filed Apr. 20, 1970, Ser. No. 29,843
Int. Cl. B29f 3/00
U.S. Cl. 18—12 N                                                    6 Claims

ABSTRACT OF THE DISCLOSURE

Apparatus for making net-like structures which include a pair of displaceable die-carrying members having sets of cooperating, complementary die-forming orifices along opposing surfaces to which flowable plastic or strand-forming material is delivered and extruded therefrom as shaped streams. Positioned between and in snug but sliding contact with the opposing surfaces of the die-carrying members is a separator plate which includes a plurality of spaced partitions for keeping the shaped streams apart at certain of their locations of crossing. The separator plate is flared laterally in the areas adjacent to the sets of orifices so as to direct the shaped streams along diverging paths as they issue from the sets of orifices.

---

The present invention relates to an improved apparatus for making net-like structures.

In the United States patent application of Theodore H. Fairbanks, Ser. No. 656,501, filed July 27, 1967, now U.S. Pat. 3,584,102, there is disclosed a method and apparatus for making an extruded net-like structure in which individual mesh strands are bonded to certain intersecting mesh strands at their locations of crossing to form integral, unitary strand junctions, and are unconnected to other of such intersecting strands at their points of crossing. The apparatus disclosed in the above-identified application includes a pair of opposing, displaceable die-carrying members having sets of cooperating, complementary die-forming orifices to which flowable plastic or strand-forming material is delivered, a separator plate having a series of spaced partitions positioned between the die-carrying members with the opposing surfaces of such members being in snug but sliding contact with the opposite sides of the partitions, and means for relatively displacing the die-carrying members. In such apparatus, the separator plate serves to prevent communication between all of the opposed sets of extrusion orifices at their entrance ends, while the partitions thereof prevent communication between orifices of such sets of orifices at certain of their locations of alignment.

In another application of Theodore H. Fairbanks, Ser. No. 677,603, filed Oct. 24, 1967, now U.S. Pat. No. 3,525,-785 there are disclosed modifications of the above-described apparatus which facilitate the extrusion of net-like structures of woven construction; that is, having strands which are in interlaced relationship.

With the apparatus disclosed in Pat. 3,584,102, as well as the modified embodiment of such apparatus disclosed in Pat. 3,525,785, the streams of plastic material issue from the respective sets of orifices in a generally vertical direction and it is essential that at least the surfaces of such streams be rapidly set to avoid bonding thereof subsequent to extrusion, at their locations of crossing. The separator plate between the two sets of orifices is only of such thickness as to satisfy strength requirements, as for example .015 inch in thickness, so that the streams issuing from such sets of orifices are in extremely close proximity with each other. Further, the extruded streams of plastic material undergo some expansion as they issue from such orifices. The setting medium must, therefore, be applied to such streams rapidly and almost immediately as they leave the extrusion orifices, with the setting of such streams being more difficult as the rate of extrusion is increased. For example, quenching of streams of molten thermoplastic material with cool air or water often results in undesirable cooling of the die members and/or movement of such streams into contact with each other.

Some success in maintaining such extruded streams separated from each other during the setting thereof has been achieved by extending the separator plate beyond the displaceable die-carrying members. Such projecting separator plate, however, does retard the free flow of the extruded streams relative thereto with the result that undesirable distortion of such streams may occur.

Accordingly, a primary object of this invention is the provision of an improved apparatus for making net-like structures by extrusion.

Another object is to provide an improved apparatus for extruding net-like structures at high rates of speed and without imparting undesirable distortion therein.

Still another object is the provision of an improved apparatus for making net-like structures by extrusion in which at least certain extruded streams of flowable strand-forming material are maintained separated from each other during at least the setting of the surfaces thereof.

A further object is the provision of an improved apparatus for extruding a plurality of individual streams of flowable strand-forming material which includes means for encouraging contact between streams at certain locations of crossing and means for maintaining and encouraging separation of streams at other locations of crossing.

These and other objects are accomplished in accordance with the present invention by an apparatus which includes a pair of spaced, displaceable die-carrying members, a separator plate, means for supporting the die-carrying members in snug but sliding contact with the opposite sides of the separator plate and means for relatively displacing the die-carrying members. Sets of cooperating, complementary die-forming orifices are provided in the opposing surfaces of the die-carrying members and means, including slots in such surfaces, to feed flowable strand-forming material continuously to such orifices.

The separator plate serves to prevent communication between the slots in the opposing surfaces of the die-carrying members at their entrance ends and includes a plurality of spaced partitions which extend inbetween the die-carrying members and prevent communication between the orifices in such members at certain of their registered or aligned positions. The opposite sides of the separator plate are flared or beveled outwardly at least along the portions thereof which are adjacent to the sets of orifices whereby streams of flowable strand-forming material extruded from one such set of orifices extend along paths which diverge relative to the paths of the streams of flowable strand-forming material issuing from the other of such sets of orifices.

The operation of the apparatus of the present invention is generally similar to that described in the above-noted Pat. 3,584,102. Thus, relative displacement of the die-carrying members causes the orifices of the respective sets to be moved into and out of registration or alignment with one another, with the separator plate partitions serving to prevent communication between at least some of the orifices of the respective sets of orifices in certain of their positions of registration. When orifices of the two sets are in communicating relationship with each other, the flowable strand-forming material which is delivered thereto is extruded in a generally downward direction through the aligned orifices as integral, unitary junction-forming streams. As such orifices are urged out of alignment by the relative displacement of the die-carrying members, the junction-forming streams are each divided into individual strand-forming streams. With movement of the orifices of the respective sets into aligned but noncommunicating relationship, as a result of an interposed separator plate partition, the strand-forming streams issue from the aligned orifices as individual streams.

With the apparatus of the present invention, during the movement of the sets of orifices relative to the separator plate partitions the flowable strand-forming material which is delivered to such orifices is urged laterally, concomitantly with its downward flow, by the flared or beveled portions along the opposite side walls of the separator plate partitions. As a result, the streams of flowable strand-forming material issuing from one such set of orifices assume paths which diverge relative to the paths of the streams of flowable strand-forming material which are extruded from the other of such sets of orifices.

The junction-forming and individual strand-forming streams of flowable material extruded from the sets of orifices of the apparatus of the present invention are rapidly set to provide a net-like structure having a desired strand pattern. While the flared or beveled portions of the separator plate partitions do cause the streams of stand-forming material issuing from the two sets of orifices in the die members to initially travel along diverging paths relative to each other, such streams are subsequently urged toward each other, as by their own weights. The initial movement of such streams along diverging paths provides for a more pronounced separation thereof as they issue from the sets of extrusion orifices which, in turn, causes the stream to travel a greater distance from the die-carrying members before they ultimately make contact with each other. The streams are set while they remain separated from each other and, in view of the accentuated initial separation thereof, a greater opportunity is provided for setting the same, setting may be effected further away from the die-carrying members and/or a more turbulent setting medium may be employed than is possible with apparatus heretofore disclosed.

The degree of divergence of the paths of the streams which are extruded from the two sets of orifices will, of course, depend upon the inclination of those portions of the side walls of the separator plate partitions which are adjacent to such sets of orifices and may be varied to suit particular conditions, such as the specific strand-forming material being extruded, the rate of extrusion and setting, the setting medium employed, etc. The flare of the side walls of the separator plate partitions may extend along the entire wall height or may be confined to only those portions which are adjacent to the sets of orifices. Further, such side walls or portions thereof may have a gradual or straight-line slope or one which is more pronounced as provided by forming the same with a concave or curved contour.

While the flared portions of the separator plate partitions do encourage diverging movement of streams issuing from orifices which are located along the opposite sides of such partitions, the apparatus of the present invention also includes means for encouraging the movement of strand-forming material into the spaces between the separator plate partitions when junction-forming streams are desired. This latter effect is readily achieved by forming in the opposing surfaces of the die-carrying members, slots which are aligned with the orifices and which are of progressively less depth as such orifices are approached. Such slots are, in effect, funnels which channel the flowable strand-forming material toward the plane of the separator plate.

Except for the differences described above, the apparatus of the present invention may be employed in a manner and with materials as described in the above-mentioned Pats. 3,525,785 and 3,584,102, the teachings of which are incorporated herein.

For a greater understanding of this invention, reference is made to the following detailed description and drawing in which FIG. 1 is a vertical section taken transversely of the apparatus of the present invention;

Figure 1:
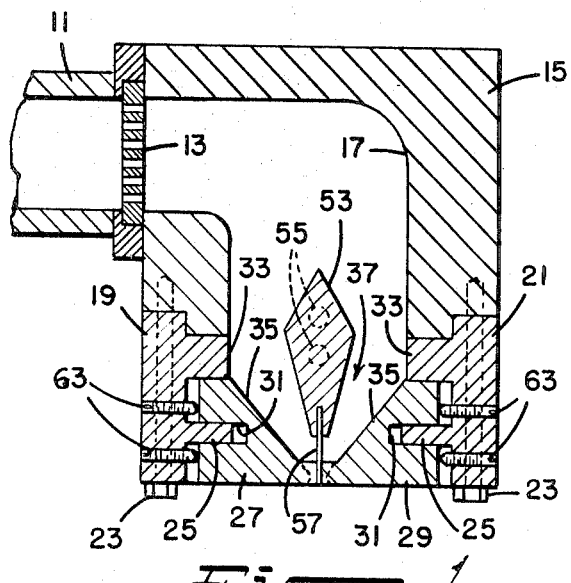

The apparatus illustrated in the drawing and hereafter described in detail is particularly adapted for use in the method as disclosed in Pat. 3,584,102. Such apparatus may be modified, as disclosed in Pat. 2,525,785 for making woven fabrics by extrusion, without departing from the scope of the invention.

With reference to the drawing, the apparatus shown in FIG. 1 is designed for making a net-like structure or fabric from thermoplastic material and includes an extruder barrel 11 through which a molten thermoplastic material is advanced by a feed screw, not shown, a screen or breaker plate 13, and an extrusion block 15 having a flow channel 17. A pair of guides 19 and 21 are fixed by bolts 23 to the extrusion block 15 and are each formed with a rib or rail 25 which together support flat die-carrying members 27 and 29 for sliding movement. More particularly, the ribs or rails 25 of the guides 19 and 21 are received within grooves 31 formed in the die-carrying members 27 and 29 so that the latter are adapted to be moved transversely of the direction of extrusion as well as in directions toward and away from each other.

As in conventional extrusion apparatus, electrical heaters and suitable insulation, not shown, may be provided about the extrusion barrel 11, block 15, and guides 19 and 21 to insure proper temperature control of the thermoplastic material during the extrusion operation.

Figure 2:
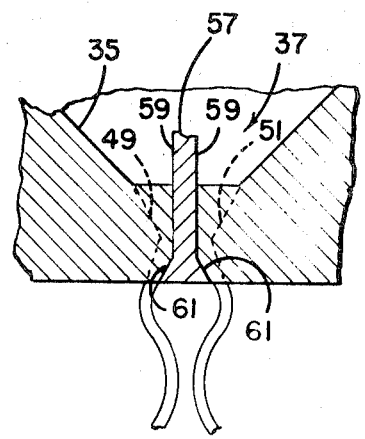
FIG. 2 is a fragmentary sectional view illustrating a portion of the apparatus shown in FIG. 1 on an enlarged scale.
Figure 3:
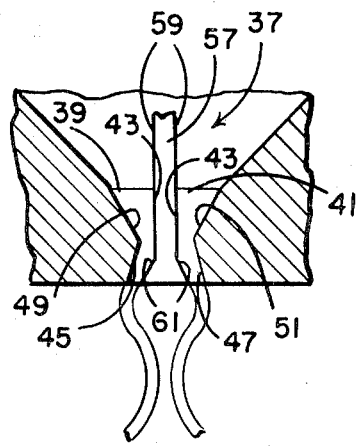
FIG. 3 is a view similar to FIG. 2 illustrating another section of a portion of the apparatus shown in FIG. 1.

Opposing surfaces 33 of the guides 19 and 21 and the opposing surfaces 35 of the die-carrying members 27 and 29 together define a cavity 37 which receives the molten thermoplastic from the flow channel 17. As best seen in FIGS. 2 and 3, a set of spaced slots or grooves 39 and 41 are formed in opposing surfaces 43 of the respective die-carrying members 27 and 39 and terminate, at the outermost sides of such members in extrusion or die orifices as indicated at 45 and 47. For reasons as hereafter discussed, the slots or grooves 39 and 41 are formed with converging bottom walls 49 and 51, respectively, so that such slots or grooves 39 and 41 gradually decrease in depth from their entrance ends. Means, not shown, are provided for relatively displacing or reciprocating the die-carrying members 27 and 29 so that the sets of spaced slots 39 and 41, and the orifices defined by such slots are periodically registered or aligned with each other.

Figure 4:
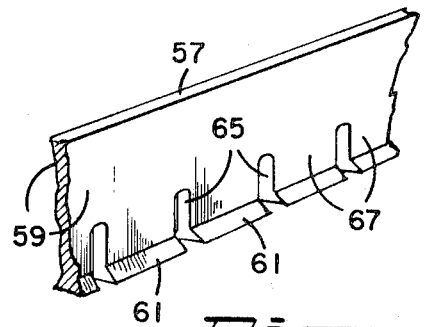
FIG. 4 is a perspective view of a portion of a separator plate employed in the apparatus shown in FIG. 1.

Positioned within and extending the length of the cavity 37 is a rigid bar 53 which is fixed by pins 55. A separator plate 57 is supported by and extends from the bar 53 and projects inbetween the die-carrying members 27 and 29. As shown in FIGS. 2–4, side walls 59 of the separator plate are flared or beveled as indicated at 61 with the opposing surfaces 43 of the die-carrying members 27 and 29 being shaped to mate with such side walls. These opposing surfaces 43 of the die-carrying members are maintained in snug but slidable contact with the sides 59 of the plate 57, as by adjusting screws 63 which extend through the guides 19 and 21 and abut against the die-carrying members. Means, not shown, may be provided for moving the separator plate relative to the supporting bar 53.

As shown in FIG. 4, the free edge of the plate 57 is slotted at 65 to provide partitions 67 and, as shown in FIGS. 1–3, the free ends of the partitions terminate along a plane which is common with the outermost surfaces of the die-carrying members 27 and 29. The upper portion of the separator plate 57 is intended to prevent communication between the entrance ends of the slots 39 and 41 in the die-carrying members 27 and 29 and thus the slots 65 between such partitions must not open into the cavity 37. The partitions 67, on the other hand, serve to prevent the orifices 45 and 47 in the die-carrying members 27 and 29, respectively, from communicating with each other in certain of their registered or aligned positions. The separator plate 57 is only of such thickness as to satisfy strength requirements, except for the flared portions thereof which are beveled to impart a desired lateral movement to strand-forming material as it issues as separate streams from the orifices 45 and 47. An apparatus formed in accordance with the present invention, having a separator plate which is .015 inch in thickness and which is flared at its free edge to a thickness of .055 inch, has been found to be satisfactory in making net-like structures by extruding molten polypropylene in accordance with the method disclosed in the aforementioned Pat. 3,584,102.

The operation of the above-described apparatus is substantially the same as that described in Patent 3,584,102, with molten thermoplastic material being advanced through the extruder barrel 11 and block flow channel 17 into the cavity 37 and slots 39 and 41. Relative movement is imparted to the die-carrying members 27 and 29, as by reciprocating the same in opposite directions, preferably at the same rate of speed. Concomitantly, with such relative displacement of the die-carrying members 27 and 29, the molten thermoplastic material is extruded through the respective sets of orifices.

As the die-carrying members 27 and 29 are moved in opposite directions to align orifices 45 and 47 with each other and with the slots 65 in the separator plate 57, the molten thermoplastic material issues therefore, as a single stream which, when set, provides an integral, unitary junction in the resulting net-like structure. With the continued travel of the die-carrying members 27 and 29, orifices 45 and 47 which were previously aligned with each other now move relative to the separator plate partitions 67 so that individual streams of strand-forming material issue therefrom. The axes of the orifices 45 and 47 are preferably parallel to the beveled portion 61 of the separator side wall which is adjacent thereto and, in view of such beveled portions, the streams issuing from the orifices 45 are directed along paths which diverge relative to the paths of the streams discharged from the orifices 47. Such streams are rapidly set after extrusion to form strands in the resulting net-like structure.

During movement relative to the separator plate partitions, orifices 45 in the die-carrying member 27 align themselves with orifices 47 in the member 29 but do not communicate with each other in view of the interposed separator plate partitions 67. The streams issuing from such aligned orifices, when set, appear as crossing but unbonded strands in the finished net-like structure. Subsequently orifices 45 and 47 in the die-carrying members 27 and 29 again align with each other and with slots 65 in the separator plate 57 so that unitary, junction-forming streams of flowable strand-forming materials are extruded therefrom. The inclined bottom walls 49 and 51 of the slots 39 and 41 direct the flowable strand-forming material toward the separator plate 57 and assure continuity in the extruded streams of strand-forming material during their transition from separate or individual strand-forming streams, which are directed along diverging paths, to unitary junction-forming streams, which issue in a substantially vertically downward direction.

Figure 5:
FIGS. 5 and 6 are transverse vertical sections of modified separator plates.
Figure 6:
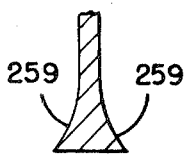

In lieu of the construction shown in FIGS. 1-4, the separator plate may be shaped as illustrated in FIG. 5, wherein the opposite side walls 159 thereof are provided with a gradual or straight-line slope along the entire height of the plate, or as shown in FIG. 6, wherein the opposite side walls 259 are formed with a convex curvature at least along the portions thereof which are to be disposed opposite to the sets or orifices in the die-carrying members.

It is to be understood that changes and variations may be made without departing from the spirit and scope of the invention as defined in the appended claims.

We claim:
1. Apparatus for continuously extruding a net-like structure including a pair of spaced displaceable die-carrying members having opposing surfaces, sets of co-operating, complementary die-forming orifices in said die-carrying members, means including slots formed in the opposing surfaces of said die-carrying members for feeding flowable strand-forming material to said orifices, a separator plate positioned between said die-carrying members, means supporting the opposite surfaces of said die-carrying members in sliding contact with the opposite sides of said separator plate, said separator plate serving to prevent communication between said slots in the opposing surfaces of said die-carrying members at their entrance ends and including a plurality of spaced partitions positioned between said die-carrying members, the opposite sides of said separator plate being flared at least along the portions thereof adjacent to said sets of orifices whereby streams of flowable strand-forming material issuing from one such set of orifices extend along diverging paths relative to streams of flowable strand-forming material issuing from the other of such sets of orifices, and means for relatively displacing said die-carrying members whereby the orifices of the respective sets are moved into and out of registration one with another with said partitions preventing communication between at least some of the orifices of the respective sets at certain of their positions of registration.

2. Apparatus as defined in claim 1 wherein the opposite sides of the separator plate are flared by having a straight-line slope substantially along the entire height of said plate.

3. Apparatus as defined in claim 1 wherein the opposite sides of the separator plate are flared only along the portions thereof which are adjacent to said sets of orifices.

4. Apparatus as defined in claim 3 wherein the flared portions of the opposite sides of the separator plate are of curved contour.

5. Apparatus as defined in claim 1 wherein said slots are each of gradually decreasing depth along only portions of the lengths thereof extending from the entrance ends of said slots.

6. Apparatus as defined in claim 1 wherein the axes of the orifices in the respective sets of orifices are substantially parallel with each other and with the plane of the flared portion of the separator plate side wall which is adjacent thereto.

References Cited

UNITED STATES PATENTS 3,163,691  12/1964  Anderson et al. ___ 18—12 N X
3,550,202  12/1970  Fairbanks _____ 18—12 N J. SPENCER OVERHOLSER, Primary Examiner B. D. TOBOR, Assistant Examiner U.S. Cl. X.R.

18—12 DV

UNITED STATES PATENT OFFICE
CERTIFICATE OF CORRECTION

Patent No. 3,621,528       Dated November 23, 1971

Inventor(s)       Theodore H. Fairbanks
                  and Robert F. Gillespie It is certified that error appears in the above-identified patent and that said Letters Patent are hereby corrected as shown below:

Col. 2, line 56, "sets" should be --set--. Col. 4, line 15, "2,525,785" should be --3,525,785--.

Signed and sealed this 30th day of May 1972.

(SEAL)
Attest:

EDWARD M. FLETCHER, JR.          ROBERT GOTTSCHALK
Attesting Officer                Commissioner of Patents